(12) United States Patent
Zimmerman

(10) Patent No.: US 9,290,255 B2
(45) Date of Patent: Mar. 22, 2016

(54) RUDDER POSITION INDICATOR

(71) Applicant: Ross M. Zimmerman, Eagan, MN (US)

(72) Inventor: Ross M. Zimmerman, Eagan, MN (US)

(73) Assignee: Ross Zimmerman, Eagan, MN (US)

( * ) Notice: Subject to any disclaimer, the term of this patent is extended or adjusted under 35 U.S.C. 154(b) by 204 days.

(21) Appl. No.: 14/201,067

(22) Filed: Mar. 7, 2014

(65) Prior Publication Data
US 2014/0251200 A1 Sep. 11, 2014

Related U.S. Application Data

(60) Provisional application No. 61/851,585, filed on Mar. 11, 2013.

(51) Int. Cl.
*B63H 25/36* (2006.01)
*B62D 15/02* (2006.01)

(52) U.S. Cl.
CPC ............ *B63H 25/36* (2013.01); *B62D 15/0205* (2013.01)

(58) Field of Classification Search
CPC ...... B62D 15/02; B62D 15/205; B63H 25/36; G01D 11/24; G01D 11/30; G01D 11/305
USPC .............. 116/26, 31, 215, 291, 292; 114/162; 74/495
See application file for complete search history.

(56) References Cited

U.S. PATENT DOCUMENTS

| | | | | | |
|---|---|---|---|---|---|
| 2,835,218 | A * | 5/1958 | Walsh | ..................... | B62D 15/02 116/31 |
| 3,165,088 | A * | 1/1965 | Hill | ........................ | B63H 25/36 114/162 |
| 3,203,390 | A * | 8/1965 | Boda | ....................... | B63H 25/36 114/144 R |
| 3,372,668 | A * | 3/1968 | Chambers | .............. | B63H 25/36 116/303 |
| 3,871,606 | A * | 3/1975 | Larson | .................. | G01D 11/305 248/27.1 |
| 4,846,094 | A * | 7/1989 | Woods | ..................... | B60Q 1/22 116/303 |
| 5,060,592 | A * | 10/1991 | Stock | ...................... | B63H 25/36 116/215 |
| 5,610,577 | A * | 3/1997 | Hwang | .................. | B62D 15/02 116/31 |
| 2007/0194899 | A1* | 8/2007 | Lipman | .............. | B62D 15/0205 340/456 |

FOREIGN PATENT DOCUMENTS

| | | | | |
|---|---|---|---|---|
| GB | 2350680 A | * | 12/2000 | ............. B62D 15/02 |
| JP | 58170673 A | * | 10/1983 | ............. B62D 15/02 |
| JP | 06185956 A | * | 7/1994 | ............. B62D 15/02 |
| KR | 20100110151 A | * | 10/2010 | ......... B62D 15/0205 |
| KR | 20110087733 A | * | 8/2011 | ............. G01D 11/30 |
| WO | WO 2006011146 A2 | * | 2/2006 | ......... B62D 15/0205 |
| WO | WO 2010114189 A1 | * | 10/2010 | ......... B62D 15/0205 |

* cited by examiner

*Primary Examiner* — R. A. Smith

(57) ABSTRACT

A rudder position indicator that is gravity driven, designed to reduce the opportunity for misalignment, and can be recalibrated without being detached in the event that misalignment occurs. The rudder position indicator includes a gear assembly having an angle indicator and a position indicator assembly that are housed within an indicator case. A dampening fluid is filled within the indicator case as well, and acts to reduce the possibility of misalignment by reducing wobble of the angle indicator as a ship wheel is rotated. The indicator case is attached to the ship wheel by means of a mounting case; the mounting case being attached to the ship wheel using an adhesive. The indicator case is rotatably positioned into the mounting case and is stepped, such that the indicator case can be locked in and out of position to calibrate the angle indicator.

20 Claims, 15 Drawing Sheets

RUDDER POSITION INDICATOR

The current application claims a priority to the U.S. Provisional Patent application Ser. No. 61/851,585 filed on Mar. 11, 2013.

FIELD OF THE INVENTION

The present invention relates generally to nautical equipment. More specifically, the present invention is a gravity-driven rudder position indicator that is rotationally adjustable. Furthermore, the present invention includes a dampening fluid to minimize misalignment of the angle indicator.

BACKGROUND OF THE INVENTION

When maneuvering ships it is often beneficial to know the exact angle in which the rudder is directed in relation to the wheel of the ship. Knowing the exact position of the rudder is critical in preventing collisions, especially when maneuvering through tight channels or pulling away from a dock. As such, many mariners utilize a rudder position indicator to display the angle of the rudder as the ship wheel is turned. A typical rudder position indicator features a rotatable needle within a casing and is attached to the center of the ship wheel. As the ship wheel is turned, the needle adjusts accordingly to display the angle of the rudder. Most rudder position indicators are attached to the ship wheel using a piece of adhesive applied on the back of the casing. When calibrated correctly most rudder position indicators are generally accurate in their display of the rudder angle, however, it is common for many rudder position indicators to become misaligned. This misalignment is often a result of the helmsman spinning the ship wheel faster than the needle can respond to gravity. In order to recalibrate the needle, the helmsman must detach the rudder position indicator from the ship wheel, zero the needle, and reapply the rudder position indicator to the ship wheel. Removing the rudder position indicator is troublesome in that it is inconvenient and can cause damage to the paint or finish of the ship wheel. Additionally, continually detaching and reattaching the rudder position indicator can cause the adhesive to lose its effectiveness and thus require replacement.

Therefore it is the object of the present invention to provide a gravity-driven rudder position indicator that reduces the opportunity for misalignment and can be recalibrated without being detached in the event that misalignment occurs. The rudder position indicator includes a gear assembly having an angle indicator and a position indicator assembly having an angle indicator panel. Both the gear assembly and the position indicator assembly are housed within an indicator case; the angle indicator being rotatably mounted in order to deflect in relation to the angle indicator panel to depict the current rudder angle. A dampening fluid is filled within the indicator case as well, and acts to reduce the possibility of misalignment by reducing wobble of the angle indicator during quick movements of a ship wheel. The indicator case is attached to the ship wheel by means of a mounting case; the mounting case being attached to the ship wheel using an adhesive. The indicator case is rotatably positioned into the mounting case and is stepped, such that the indicator case can be locked in and out of position to calibrate the angle indicator.

DETAIL DESCRIPTIONS OF THE INVENTION

Figure 1:
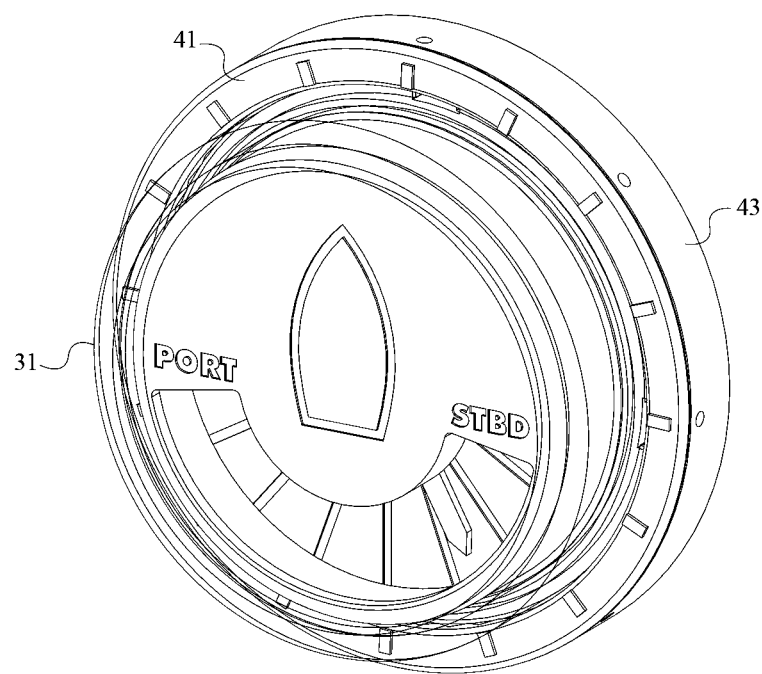
FIG. 1 is a perspective view of the present invention.

All illustrations of the drawings are for the purpose of describing selected versions of the present invention and are not intended to limit the scope of the present invention.

The present invention is a rudder position indicator that is gravity driven and is designed to reduce the occurrence of misalignment. In the event that the rudder position indicator does become misaligned, the rudder position indicator does not need to be detached from a ship wheel.

The rudder position indicator comprises a gear assembly 10, a position indicator assembly 20, an indicator case 30, a mounting case 40, a dampening fluid 50, and an adhesive 60. The gear assembly 10 and the position indicator assembly 20 are positioned within the indicator case 30 and provide the means for displaying the angle of the rudder. The dampening fluid 50 is also positioned within the indicator case 30 and acts to reduce indicator wobble, which in turn acts to reduce the opportunity for misalignment of the rudder position indicator. The indicator case 30 is rotatably positioned into the mount case, such that the gear assembly 10 and the position indicator assembly 20 can be realigned if necessary. The adhesive 60 is connected to the mount case opposite the indicator case 30 and allows the rudder position indicator to be attached to the ship wheel.

Figure 3:
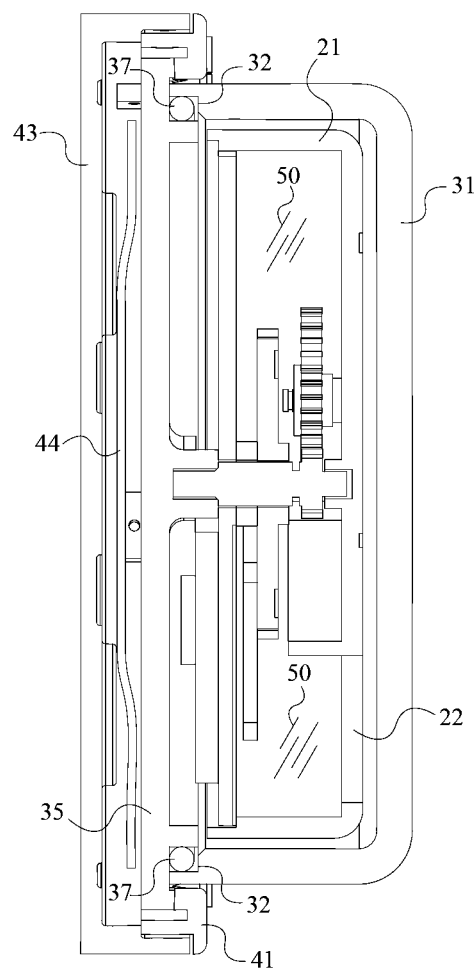
FIG. 3 is a left side sectional view of the present invention.

In reference to FIG. 1 and FIG. 3, the indicator case 30 comprises a top indicator case 31, a stepped bottom indicator case 35, and a case seal 37. The top indicator case 31 is a translucent shell, while the stepped bottom indicator case 35 is a disc having a diameter greater than the diameter of the top indicator case 31. The top indicator case 31 is adjacently connected to the stepped bottom indicator case 35 in order to form a closed housing for the gear assembly 10, the position indicator assembly 20, and the dampening fluid 50. In the preferred embodiment of the present invention, the top indicator case 31 is sonic welded to the stepped bottom indicator case 35, however, it is possible for the top indicator case 31 and the stepped bottom indicator case 35 to be connected in any other way.

In reference to FIG. 3, the top indicator case 31 comprises an annular groove 32 that is positioned adjacent to the stepped bottom indicator case 35. The case seal 37 is positioned into the annular groove 32, such that a fluid tight connection is created when the top indicator case 31 is connected to the stepped bottom indicator case 35 in order to prevent the dampening fluid 50 from leaking out of the indicator case 30. In the preferred embodiment of the present invention, the case seal 37 is a rubber o-ring, however, it is possible for the case seal 37 to be any other type of fluid tight mechanical seal. The stepped bottom indicator case 35 comprises a plurality of indicator teeth 36 that is positioned around the top indicator case 31 and provides a selectively stepped means of engagement between the indicator case 30 and the mount case.

Figure 4:
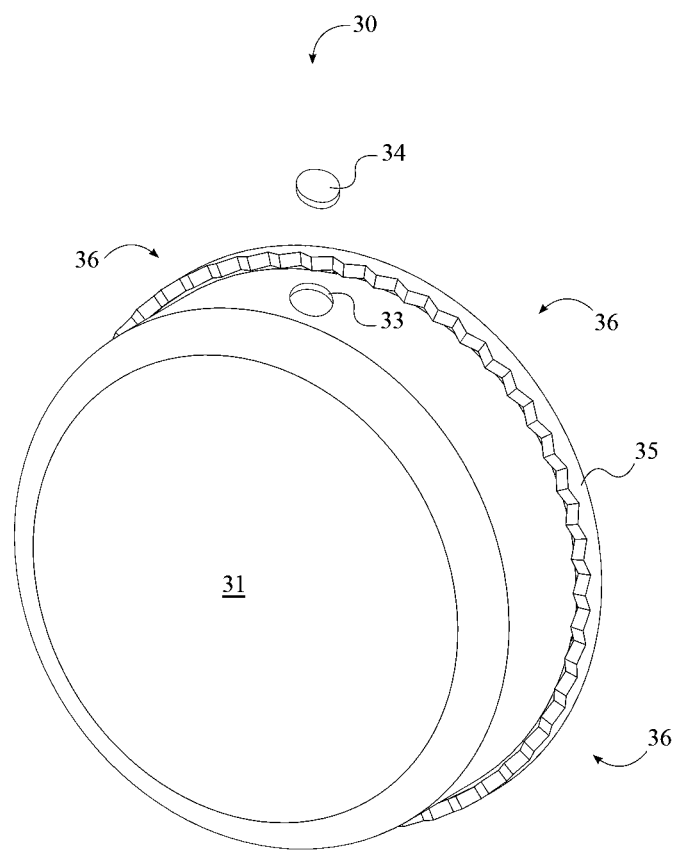
FIG. 4 is a perspective view of the indicator case with the plug removed.
Figure 5:
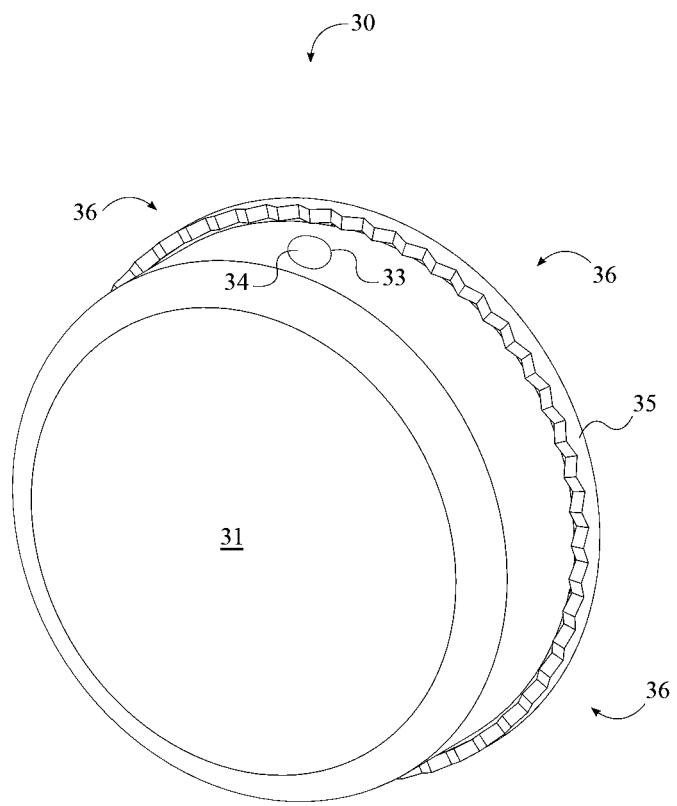
FIG. 5 is a perspective view of the present invention with the plug positioned into the fill hole.

In the preferred embodiment of the present invention, the top indicator case 31 further comprises a fill hole 33 and a plug 34. The fill hole 33 is laterally positioned on the top indicator case 31, as shown in FIG. 4, and provides a means for filling the indicator case 30 with the dampening fluid 50. Once the dampening fluid 50 is filled into the indicator case 30, the plug 34 is positioned into the fill hole 33, as shown in FIG. 5, and sealed in place to prevent the dampening fluid 50 from escaping the indicator case 30.

Figure 6:
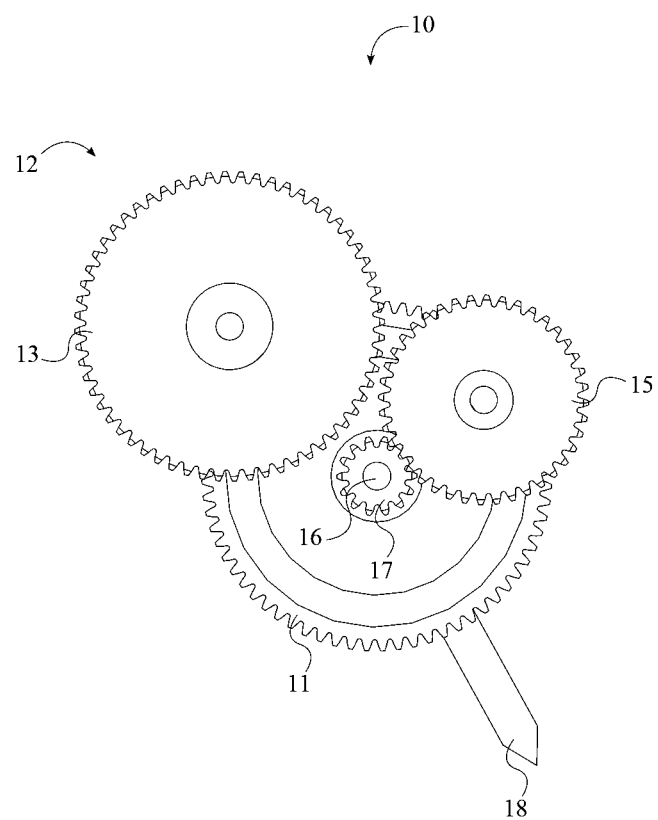
FIG. 6 is a front elevational view of the gear assembly.
Figure 7:
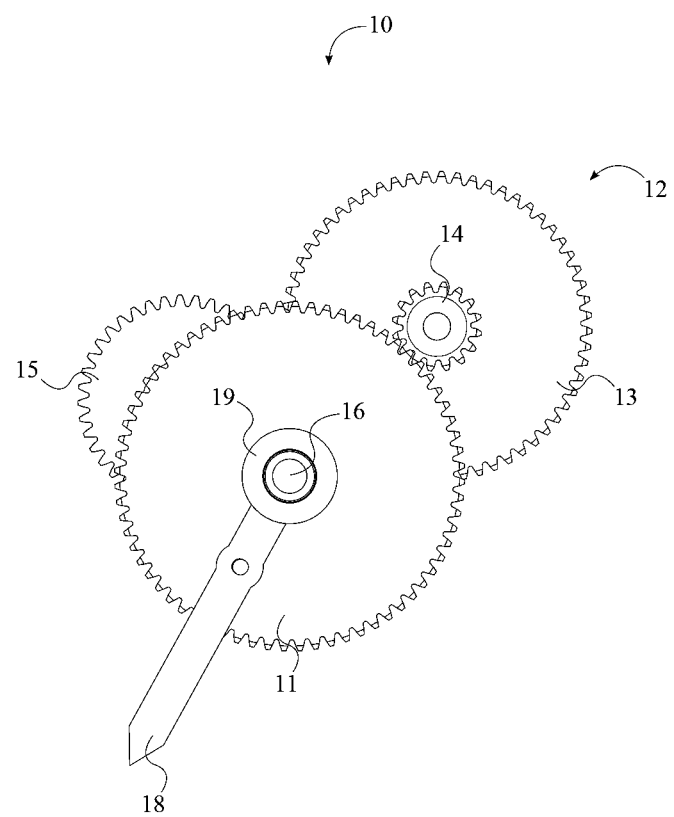
FIG. 7 is a rear elevational view of the gear assembly.
Figure 11:
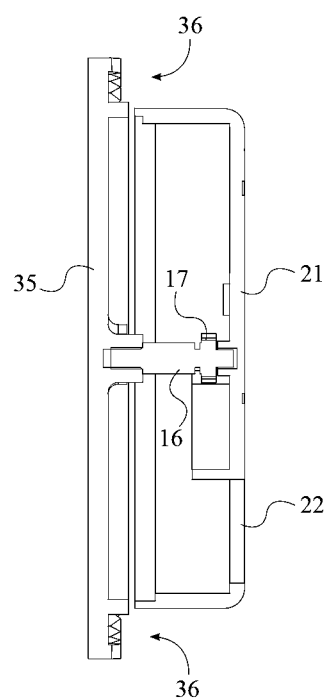
FIG. 11 is a left side sectional view showing the spindle centrally connected to the stepped bottom indicator case and the weighted indicator rotatably connected to the spindle.

In reference to FIG. 6-7, the gear assembly 10 comprises a rudder indicator gear 11, a transmission gear 12, an idler gear 15, a spindle 16, a spindle gear 17, an angle indicator 18, and a spacer 19. The angle indicator 18 is adjacently connected to the rudder indicator gear 11, while the spindle gear 17 is connected to the spindle 16. The spindle 16 is the main drive shaft of the gear assembly 10 and is centrally connected to the stepped bottom indicator case 35 on the same side as the plurality of indicator teeth 36, as shown in FIG. 11. Together, the spindle gear 17, the idler gear 15, and the transmission gear 12 form an idler-wheel drive that transmits the rotation of the spindle 16 to the rudder indicator gear 11, such that the angle indicator 18 deflects in the same direction as the rudder. As such, the idler gear 15 engages both the spindle gear 17 and the transmission gear 12, and the transmission gear 12 further engages the rudder indicator gear 11.

In reference to FIG. 7, the transmission gear 12 comprises a first gear 13 and a second gear 14; the first gear 13 being adjacently connected to the second gear 14, such that the first gear 13 and the second gear 14 rotate in tandem. The first gear 13 engages the idler gear 15, while the second gear 14 engages the rudder indicator gear 11.

Figure 10:
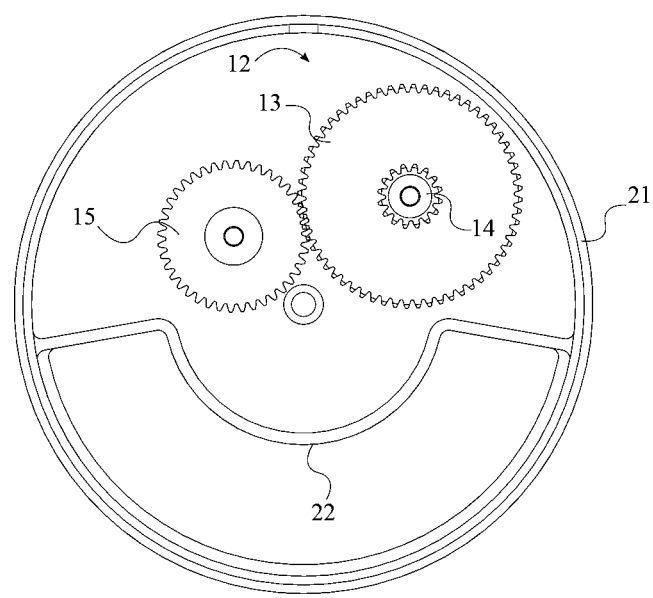
FIG. 10 is a rear elevational view showing the idler gear and the transmission gear rotatably connected to the weighted indicator.

The position indicator assembly 20 comprises a weighted indicator 21, an angle indicator panel 23, and a weight 26. The weighted indicator 21 is rotatably connected to the spindle 16 opposite the stepped bottom indicator case 35, such that the spindle gear 17 is positioned in between the weighted indicator 21 and the stepped bottom indicator case 35, as shown in FIG. 11. Both the idler gear 15 and the transmission gear 12 are rotatably connected to the weighted indicator 21, as shown in FIG. 10. The weighted indicator 21 comprises an indicator opening 22 that is positioned adjacent to the idler gear 15 and the transmission gear 12. The weighted indicator 21 is biased such that the indicator opening 22 remains positioned about the bottom half of the rudder position indicator. Additionally, the weighted indicator 21 has markings signaling the port side and starboard side of the ship.

Figure 12:
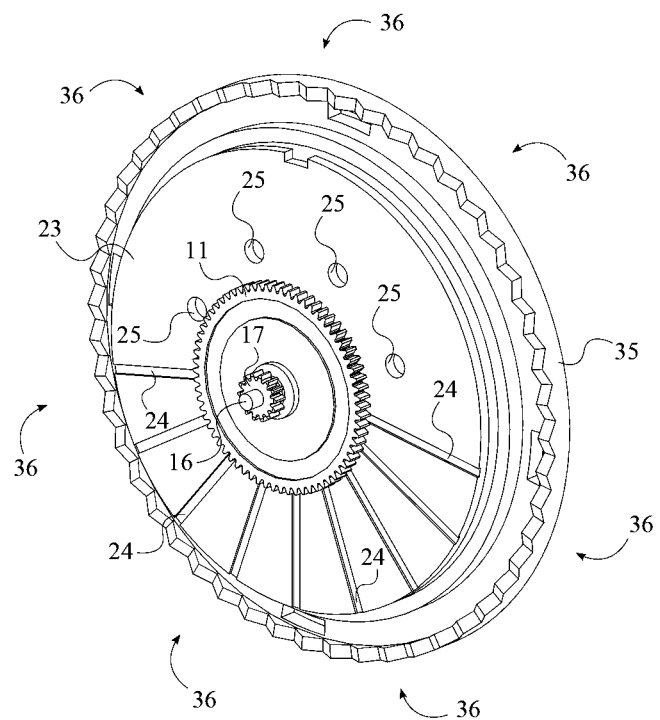
FIG. 12 is a perspective view of the rudder indicator gear and the angle indicator panel rotatably positioned along the spindle.

In reference to FIG. 12, the angle indicator panel 23 is rotatably positioned along the spindle 16 in between the spindle gear 17 and the stepped bottom indicator case 35. The weight 26 is adjacently connected to angle indicator panel 23 and is positioned in between the angle indicator panel 23 and the stepped bottom indicator case 35. In the preferred embodiment of the present invention, the weight 26 is constructed from a non-corrosive metal and is cut with an arc of one hundred twenty degrees, however, it is possible for the weight 26 to be constructed from any other material and cut to any other shape and size.

In further reference to FIG. 12, the rudder indicator gear 11 is also rotatably positioned along the spindle 16 and is positioned in between the spindle gear 17 and the weighted indicator 21. The spacer 19 is positioned around the spindle 16 in between the rudder indicator gear 11 and the angle indicator panel 23, and acts to position the rudder indicator gear 11 away from the angle indicator panel 23. In the preferred embodiment of the present invention, the spacer 19 is adjacently connected to the angle indicator 18.

Figure 8:
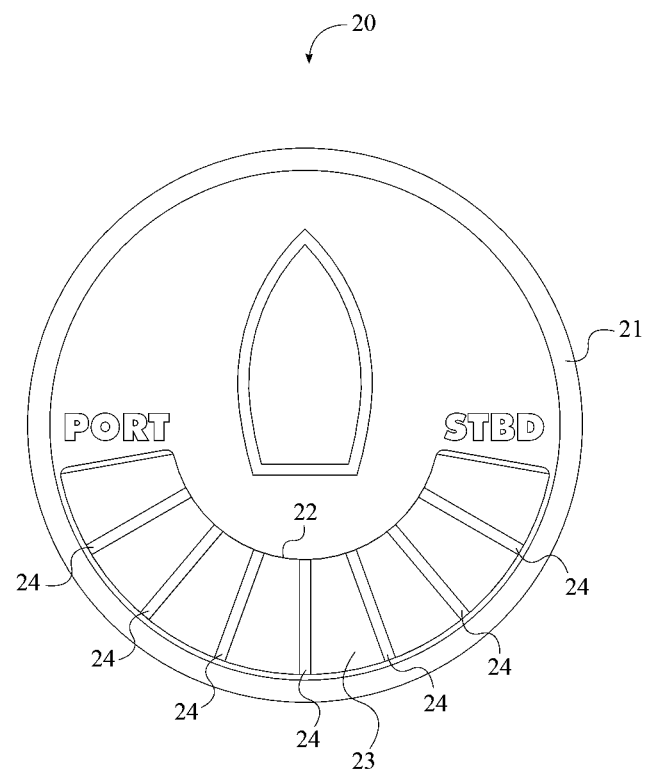
FIG. 8 is a front elevational view of the position indicator assembly.
Figure 9:
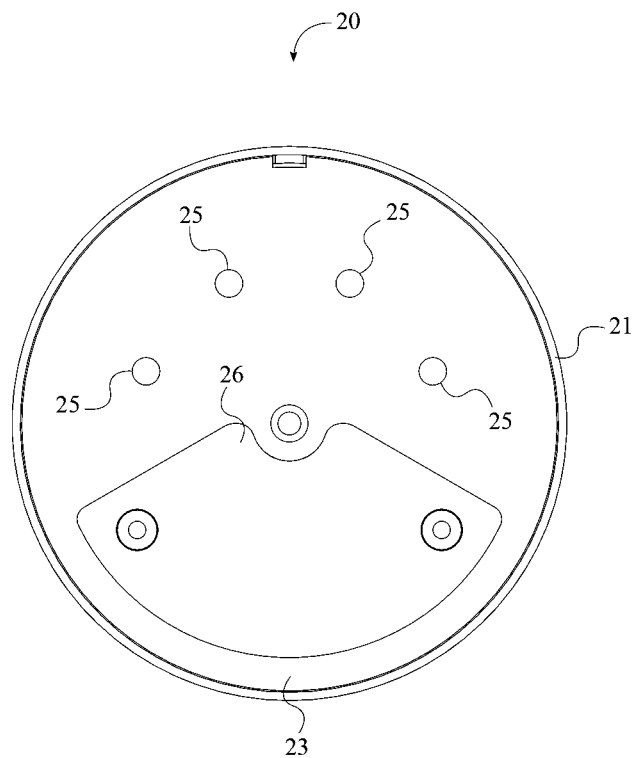
FIG. 9 is a rear elevational view of the position indicator assembly.

In reference to FIG. 8-9, the angle indicator panel 23 comprises a plurality of angle marks 24 and a plurality of fluid holes 25. The plurality of angle marks 24 is positioned on the angle indicator panel 23 opposite the weight 26, while the plurality of fluid holes 25 is positioned adjacent to the weight 26. The weight 26 acts to bias the angle indicator panel 23 such that the plurality of angle marks 24 remain positioned about the bottom half of the rudder position indicator, wherein the plurality of angle marks 24 can be viewed through the indicator opening 22 of the weighted indicator 21. The plurality of fluid holes 25 allows the dampening fluid 50 to freely flow through the angle indicator panel 23. In the preferred embodiment of the present invention, each of the plurality of angle marks 24 is spaced in twenty degree increments to indicate the rudder deflection. However, it is possible for the plurality of angle marks 24 to be spaced in any other measured increments.

Figure 2:
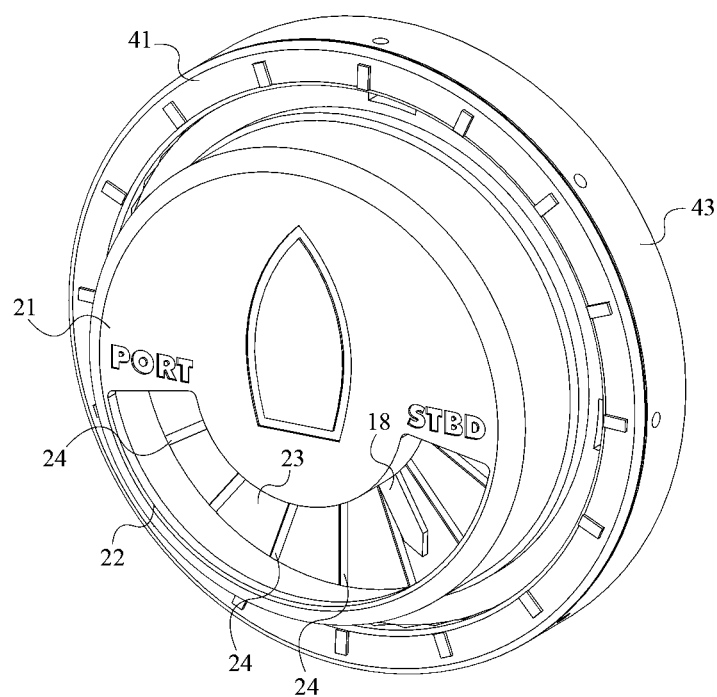
FIG. 2 is a perspective view of the present invention with the top indicator case removed.
Figure 15:
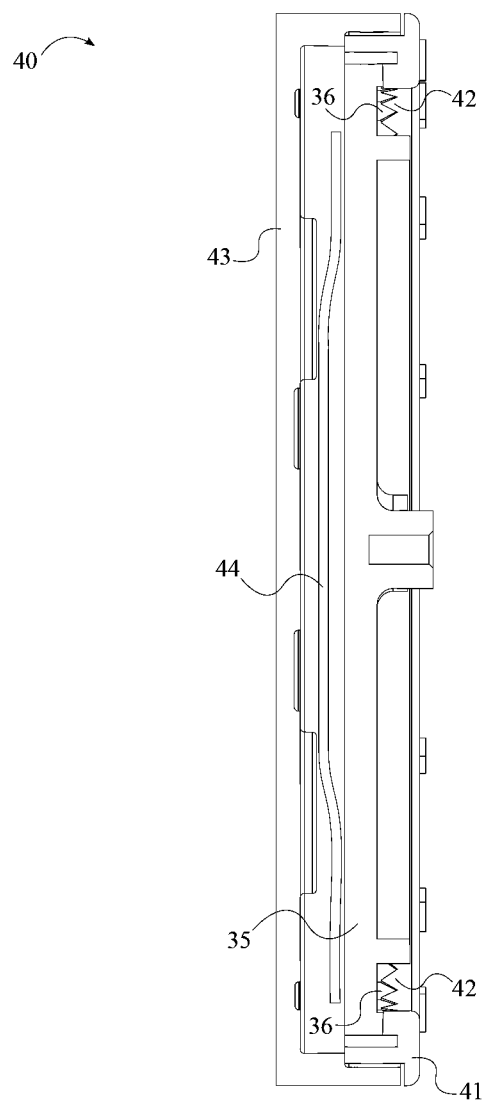
FIG. 15 is a left side sectional view of the stepped bottom indicator case positioned in between the stepped top mount case and the bottom mount case.

In reference to FIG. 2 and FIG. 15, the mounting case 40 provides the means by which the indicator case 30 is attached to the ship wheel and comprises a stepped top mount case 41, a bottom mount case 43, and a spring 44. The stepped top mount case 41 comprises a plurality of mount teeth 42 and is adjacently connected to the bottom mount case 43, such that the plurality of mount teeth 42 is directed towards the bottom mount case 43. In the preferred embodiment of the present invention, the stepped top mount case 41 is sonic welded to the bottom mount case 43, however, it is possible for the stepped top mount case 41 and the bottom mount case 43 to be connected in any other way. The stepped bottom indicator case 35 is rotatably positioned in between the stepped top mount case 41 and the bottom mount case 43, wherein the stepped bottom indicator case 35 selectively engages the stepped top mount case 41.

Figure 13:
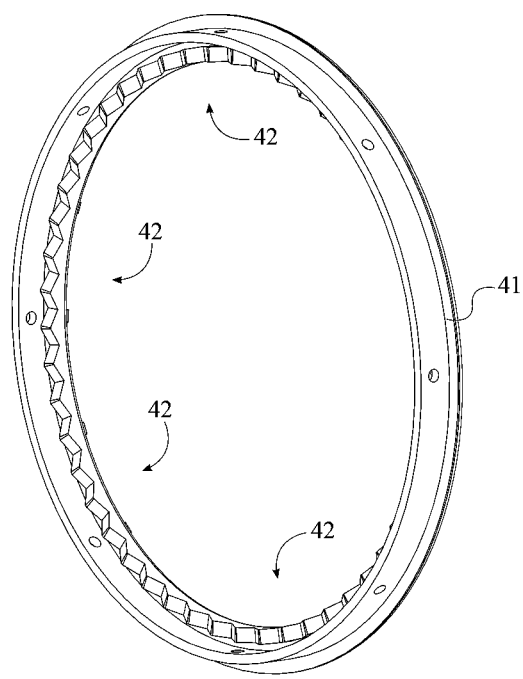
FIG. 13 is a perspective view of the stepped top mount case.

In reference to FIG. 13 and FIG. 15, the plurality of indicator teeth 36 is perimetrically positioned on the stepped bottom indicator case 35 opposite the bottom case mount. Similarly, the plurality of mount teeth 42 is perimetrically positioned on the stepped top mount case 41 adjacent to the stepped bottom indicator case 35. The spring 44 is positioned in between the stepped bottom indicator case 35 and the bottom mount case 43 and allows the plurality of indicator teeth 36 to selectively engage the plurality of mount teeth 42. When the indicator case 30 is pressed towards the bottom mount case 43, the spring 44 compresses and the plurality of indicator teeth 36 disengages the plurality of mount teeth 42. In this way, the indicator case 30 can be rotated in order to calibrate the angle indicator 18 with reference to the plurality of angle marks 24. Once the angle indicator 18 has been calibrated, pressure is taken off of the indicator case 30, thus allowing the spring 44 to decompress and force the plurality of indicator teeth 36 to re-engage the plurality of mount teeth 42.

Figure 14:
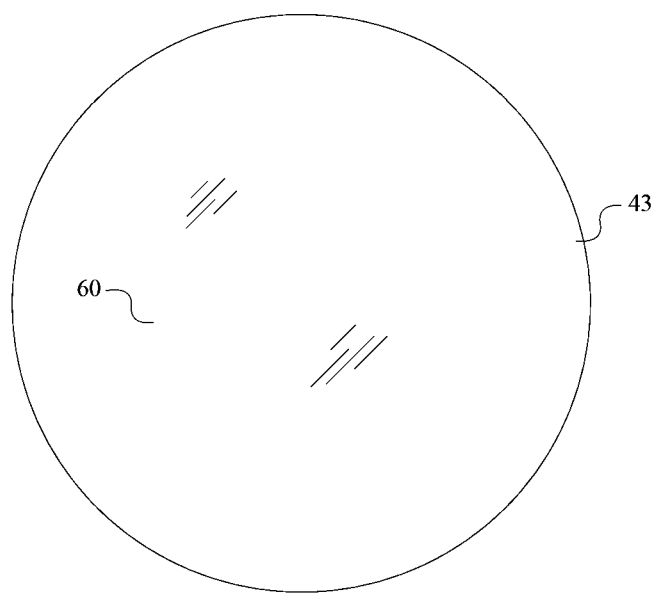
FIG. 14 is a rear elevational view of the bottom mount case.

When the rudder position indicator is in use, the adhesive 60 is connected to the bottom mount case 43 opposite the stepped bottom indicator case 35, as depicted in FIG. 14, and the mount case is then attached to the ship wheel via the adhesive 60. As the ship wheel is rotated, the mount case, the indicator case 30, the spindle 16, and the spindle gear 17 rotate in unison. Meanwhile, the weighted indicator 21 and the angle indicator panel 23 are allowed to freely rotate about the spindle 16, such that they remain in the same apparent position. The spindle gear 17 drives the idler gear 15, which in turn drives the transmission gear 12, which in turn drives the rudder indicator gear 11. In this way, as the rudder indicator gear 11 rotates, the angle indicator 18 is deflected in the same direction of the rudder. The dampening fluid 50 acts to prevent the angle indicator 18 from wobbling in response to quick rotation of the ship wheel. Ideally the dampening fluid 50 is either water or a mixture of water and alcohol, however, it is also possible for the dampening fluid 50 to be any other fluid or mixture having an appropriate viscosity.

Although the invention has been explained in relation to its preferred embodiment, it is to be understood that many other possible modifications and variations can be made without departing from the spirit and scope of the invention as hereinafter claimed.

What is claimed is:

1. A rudder position indicator comprises:
    a gear assembly;
    a position indicator assembly;
    an indicator case;
    a mounting case;
    a dampening fluid;
    the gear assembly comprises a rudder indicator gear, a transmission gear, an idler gear, a spindle, a spindle gear, and an angle indicator;
    the position indicator assembly comprises a weighted indicator, an angle indicator panel, and a weight;
    the indicator case comprises a top indicator case and a stepped bottom indicator case;
    the mounting case comprises a stepped top mount case and a bottom mount case;
    the top indicator case being adjacently connected to the stepped bottom indicator case;
    the gear assembly, the position indicator assembly, and the dampening fluid being positioned within the indicator case;
    the transmission gear and the idler gear being rotatably connected to the weighted indicator;
    the spindle being centrally connected to the stepped bottom indicator case;
    the weighted indicator being rotatably connected to the spindle opposite the stepped bottom indicator case;
    the spindle gear being connected to the spindle in between the weighted indicator and the stepped bottom indicator case;
    the weight being adjacently connected to the angle indicator panel;
    the angle indicator panel being rotatably positioned along the spindle in between the spindle gear and the stepped bottom indicator case;
    the weight being positioned in between the angle indicator panel and the stepped bottom indicator case;
    the rudder indicator gear being rotatably positioned along the spindle in between the spindle gear and the weighted indicator;
    the angle indicator being adjacently connected to the rudder indicator gear;
    the idler gear engaging both the spindle gear and the transmission gear;
    the transmission gear engaging the rudder indicator gear;
    the stepped top mount case being adjacently connected to the bottom mount case;
    the stepped bottom indicator case being rotatably positioned in between the stepped top mount case and the bottom mount case; and
    the stepped bottom indicator case selectively engaging the stepped top mount case.

2. The rudder position indicator as claimed in claim 1 comprises:
    the transmission gear comprises a first gear and a second gear;
    the first gear being adjacently connected to the second gear;
    the first gear engaging the idler gear; and
    the second gear engaging the rudder indicator gear.

3. The rudder position indicator as claimed in claim 1 comprises:
    the indicator case further comprises a case seal;
    the top indicator case comprises an annular groove;
    the annular groove being positioned adjacent to the stepped bottom indicator case; and
    the case seal being positioned into the annular groove.

4. The rudder position indicator as claimed in claim 1 comprises:
    the mounting case further comprises a spring;
    the stepped bottom indicator case comprises a plurality of indicator teeth;
    the stepped top mount case comprises a plurality of mount teeth;
    the plurality of indicator teeth being perimetrically positioned on the stepped bottom indicator case opposite the bottom mount case;
    the plurality of indicator teeth being positioned around the top indicator case;
    the plurality of mount teeth being perimetrically positioned on the stepped top mount case adjacent to the stepped bottom indicator case;
    the plurality of indicator teeth selectively engaging the plurality of mount teeth; and
    the spring being positioned in between the stepped bottom indicator case and the bottom mount case.

5. The rudder position indicator as claimed in claim 1 comprises:
    the angle indicator panel comprises a plurality of angle marks; and
    the plurality of angle marks being positioned on the angle indicator panel opposite the weight.

6. The rudder position indicator as claimed in claim 1 comprises:
    the top indicator case comprises a fill hole and a plug;
    the fill hole being laterally positioned on the top indicator case; and
    the plug being positioned into the fill hole.

7. The rudder position indicator as claimed in claim 1 comprises:
    the angle indicator panel comprises a plurality of fluid holes; and
    the plurality of fluid holes being positioned adjacent to the weight.

8. The rudder position indicator as claimed in claim 1 comprises:
    an adhesive; and
    the adhesive being connected to the bottom mount case opposite the indicator case.

9. The rudder position indicator as claimed in claim 1 comprises:
    the weighted indicator comprises an indicator opening; and
    the indicator opening being positioned adjacent to the transmission gear and the idler gear.

10. The rudder position indicator as claimed in claim 1 comprises:
the gear assembly further comprises a spacer; and
the spacer being positioned around the spindle in between the rudder indicator gear and the angle indicator panel.

11. A rudder position indicator comprises:
a gear assembly;
a position indicator assembly;
an indicator case;
a mounting case;
a dampening fluid;
the gear assembly comprises a rudder indicator gear, a transmission gear, an idler gear, a spindle, a spindle gear, and an angle indicator;
the position indicator assembly comprises a weighted indicator, an angle indicator panel, and a weight;
the indicator case comprises a top indicator case and a stepped bottom indicator case;
the mounting case comprises a stepped top mount case, a bottom mount case, and a spring;
the transmission gear comprises a first gear and a second gear;
the weighted indicator comprises an indicator opening;
the angle indicator panel comprises a plurality of angle marks;
the stepped bottom indicator case comprises a plurality of indicator teeth;
the stepped top mount case comprises a plurality of mount teeth;
the top indicator case being adjacently connected to the stepped bottom indicator case;
the gear assembly, the position indicator assembly, and the dampening fluid being positioned within the indicator case;
the transmission gear and the idler gear being rotatably connected to the weighted indicator;
the indicator opening being positioned adjacent to the transmission gear and the idler gear;
the spindle being centrally connected to the stepped bottom indicator case;
the weighted indicator being rotatably connected to the spindle opposite the stepped bottom indicator case;
the spindle gear being connected to the spindle in between the weighted indicator and the stepped bottom indicator case;
the weight being adjacently connected to the angle indicator panel;
the plurality of angle marks being positioned on the angle indicator panel opposite the weight;
the angle indicator panel being rotatably positioned along the spindle in between the spindle gear and the stepped bottom indicator case;
the weight being positioned in between the angle indicator panel and the stepped bottom indicator case;
the rudder indicator gear being rotatably positioned along the spindle in between the spindle gear and the weighted indicator;
the angle indicator being adjacently connected to the rudder indicator gear;
the first gear being adjacently connected to the second gear;
the idler gear engaging both the spindle gear and the first gear;
the second gear engaging the rudder indicator gear;
the stepped top mount case being adjacently connected to the bottom mount case;
the stepped bottom indicator case being rotatably positioned in between the stepped top mount case and the bottom mount case;
the plurality of indicator teeth being perimetrically positioned on the stepped bottom indicator case opposite the bottom mount case;
the plurality of indicator teeth being positioned around the top indicator case;
the plurality of mount teeth being perimetrically positioned on the stepped top mount case adjacent to the stepped bottom indicator case;
the plurality of indicator teeth selectively engaging the plurality of mount teeth; and
the spring being positioned in between the stepped bottom indicator case and the bottom mount case.

12. The rudder position indicator as claimed in claim 11 comprises:
the indicator case further comprises a case seal;
the top indicator case comprises an annular groove;
the annular groove being positioned adjacent to the stepped bottom indicator case; and
the case seal being positioned into the annular groove.

13. The rudder position indicator as claimed in claim 11 comprises:
the top indicator case comprises a fill hole and a plug;
the fill hole being laterally positioned on the top indicator case; and
the plug being positioned into the fill hole.

14. The rudder position indicator as claimed in claim 11 comprises:
the angle indicator panel further comprises a plurality of fluid holes; and
the plurality of fluid holes being positioned adjacent to the weight.

15. The rudder position indicator as claimed in claim 11 comprises:
an adhesive; and
the adhesive being connected to the bottom mount case opposite the indicator case.

16. The rudder position indicator as claimed in claim 11 comprises:
the gear assembly further comprises a spacer; and
the spacer being positioned around the spindle in between the rudder indicator gear and the angle indicator panel.

17. A rudder position indicator comprises:
a gear assembly;
a position indicator assembly;
an indicator case;
a mounting case;
a dampening fluid;
the gear assembly comprises a rudder indicator gear, a transmission gear, an idler gear, a spindle, a spindle gear, and an angle indicator;
the position indicator assembly comprises a weighted indicator, an angle indicator panel, and a weight;
the indicator case comprises a top indicator case, a stepped bottom indicator case, and a case seal;
the mounting case comprises a stepped top mount case, a bottom mount case, and a spring;
the transmission gear comprises a first gear and a second gear;
the weighted indicator comprises an indicator opening;
the angle indicator panel comprises a plurality of angle marks and a plurality of fluid holes;
the top indicator case comprises an annular groove;
the stepped bottom indicator case comprises a plurality of indicator teeth;

the stepped top mount case comprises a plurality of mount teeth;

the top indicator case being adjacently connected to the stepped bottom indicator case;

the annular groove being positioned adjacent to the stepped bottom indicator case;

the case seal being positioned into the annular groove;

the gear assembly, the position indicator assembly, and the dampening fluid being positioned within the indicator case;

the transmission gear and the idler gear being rotatably connected to the weighted indicator;

the indicator opening being positioned adjacent to the transmission gear and the idler gear;

the spindle being centrally connected to the stepped bottom indicator case;

the weighted indicator being rotatably connected to the spindle opposite the stepped bottom indicator case;

the spindle gear being connected to the spindle in between the weighted indicator and the stepped bottom indicator case;

the weight being adjacently connected to the angle indicator panel;

the plurality of angle marks being positioned on the angle indicator panel opposite the weight;

the plurality of fluid holes being positioned adjacent to the weight;

the angle indicator panel being rotatably positioned along the spindle in between the spindle gear and the stepped bottom indicator case;

the weight being positioned in between the angle indicator panel and the stepped bottom indicator case;

the rudder indicator gear being rotatably positioned along the spindle in between the spindle gear and the weighted indicator;

the angle indicator being adjacently connected to the rudder indicator gear;

the first gear being adjacently connected to the second gear;

the idler gear engaging both the spindle gear and the first gear;

the second gear engaging the rudder indicator gear;

the stepped top mount case being adjacently connected to the bottom mount case;

the stepped bottom indicator case being rotatably positioned in between the stepped top mount case and the bottom mount case;

the plurality of indicator teeth being perimetrically positioned on the stepped bottom indicator case opposite the bottom mount case;

the plurality of indicator teeth being positioned around the top indicator case;

the plurality of mount teeth being perimetrically positioned on the stepped top mount case adjacent to the stepped bottom indicator case;

the plurality of indicator teeth selectively engaging the plurality of mount teeth; and the spring being positioned in between the stepped bottom indicator case and the bottom mount case.

18. The rudder position indicator as claimed in claim 17 comprises:

the top indicator case further comprises a fill hole and a plug;

the fill hole being laterally positioned on the top indicator case; and the plug being positioned into the fill hole.

19. The rudder position indicator as claimed in claim 17 comprises:

an adhesive; and the adhesive being connected to the bottom mount case opposite the indicator case.

20. The rudder position indicator as claimed in claim 17 comprises:

the gear assembly further comprises a spacer; and the spacer being positioned around the spindle in between the rudder indicator gear and the angle indicator panel.

* * * * *